United States Patent
Kee et al.

(10) Patent No.: US 9,380,139 B2
(45) Date of Patent: Jun. 28, 2016

(54) SPEAKER AND KEYPAD ASSEMBLY FOR A PORTABLE COMMUNICATION DEVICE

(71) Applicant: MOTOROLA SOLUTIONS, INC., Schaumburg, IL (US)

(72) Inventors: Cheah Chan Kee, Penang (MY); Maria C. Forero Mujica, Boca Raton, FL (US); Deborah A. Gruenhagen, Southwest Ranches, FL (US); Chi Meng Khong, Penang (MY); Dharmendrasinh R. Mahida, Plantation, FL (US); Andrew P. Miehl, Plantation, FL (US); Ban Hin Ooi, Penang (MY); Bernie Peng Chung Tan, Penang (MY); Cheah Heng Tan, Penang (MY)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 107 days.

(21) Appl. No.: 14/057,414

(22) Filed: Oct. 18, 2013

(65) Prior Publication Data

US 2015/0111622 A1    Apr. 23, 2015

(51) Int. Cl.
| | |
|---|---|
| *H04B 7/00* | (2006.01) |
| *H04M 1/03* | (2006.01) |
| *H04B 1/3888* | (2015.01) |
| *H04M 1/18* | (2006.01) |
| *H04M 1/23* | (2006.01) |

(52) U.S. Cl.
CPC .............. *H04M 1/03* (2013.01); *H04B 1/3888* (2013.01); *H04M 1/18* (2013.01); *H04M 1/23* (2013.01)

(58) Field of Classification Search
CPC ........... H04B 2001/3894; H04B 1/086; H04B 1/3833; H01H 13/702; H01H 2223/0345; H01H 2231/022; H04R 1/00

USPC ......... 455/347, 350, 90, 156, 550.1; 381/188, 381/152, 205; 379/368, 388, 420, 433.06
See application file for complete search history.

(56) References Cited

U.S. PATENT DOCUMENTS

| | | | |
|---|---|---|---|
| 5,265,274 A * | 11/1993 | Knutson et al. | 455/347 |
| 5,721,787 A | 2/1998 | Neibaur et al. | |
| 6,788,793 B2 | 9/2004 | Tanemura et al. | |
| 7,561,418 B2 | 7/2009 | Na | |
| 7,565,178 B1 | 7/2009 | Sitachitt et al. | |
| 7,590,234 B2 * | 9/2009 | Burnette et al. | 379/433.07 |
| 8,923,760 B2 * | 12/2014 | Iwasaki | H04W 4/008 455/41.1 |
| 9,245,250 B2 * | 1/2016 | Williams | G06Q 30/0625 |
| 9,294,869 B2 * | 3/2016 | Pang | H04W 4/008 |
| 2003/0116412 A1 | 6/2003 | Lu | |
| 2007/0188412 A1 * | 8/2007 | Kim | G06F 1/1616 345/65 |
| 2010/0040214 A1 * | 2/2010 | Cohen | G06Q 20/10 379/114.01 |
| 2012/0165083 A1 | 6/2012 | Gong | |
| 2014/0006798 A1 * | 1/2014 | Prakash | G06F 21/72 713/189 |

FOREIGN PATENT DOCUMENTS

| | | |
|---|---|---|
| EP | 2080352 B1 | 10/2008 |
| JP | 11-143579 A | 5/1999 |
| JP | 2005-236894 A | 9/2005 |

* cited by examiner

*Primary Examiner* — Edward Urban
*Assistant Examiner* — Max Mathew
(74) *Attorney, Agent, or Firm* — Barbara R. Doutre (57) ABSTRACT

An improved keypad and speaker assembly is provided. The assembly (100) comprises a speaker grille formed of tortuous porting (220), and a keyboard (108) comprising audio slots (120) which are offset beneath the tortuous porting (220). The speaker (104) is aligned beneath the keyboard (108). The tortuous porting (220) and audio slots (120) provide an unobstructed air passage/path between the speaker and ambient while protecting against water intrusion.

25 Claims, 12 Drawing Sheets

SPEAKER AND KEYPAD ASSEMBLY FOR A PORTABLE COMMUNICATION DEVICE

FIELD OF THE INVENTION

The present invention relates generally to a communication device and more particularly to an assembly for a speaker and keypad for such a portable communication device.

BACKGROUND

Communication devices, such as portable radios, are utilized in a wide variety of communication environments, such as law enforcement, fire, rescue, security and the like. A portable, handheld radio is typically housed within a plastic enclosure, and depending on user interface requirements, the housing may offer a push-to-talk switch, control knobs, keypad, speaker grill and display.

In recent years, there has been a strong desire to miniaturize such products for ease of portability and weight. However, current trends to miniaturize the overall radio size must be balanced with the ability to maintain a logistical user interface while maintaining structural robustness.

The front of the radio typically includes the speaker, display and keypad, with the combination of these elements making up the actual overall length. Given that speaker porting is critical and that displays are getting larger, the keypad has often has to decrease in size in order to align with radio miniaturization. However, decreasing the size of the keypad can make the user interface difficult, particularly in the public safety market where gloves may be worn by the user of the radio. Additionally, audio porting within an assembly must be carefully considered to avoid problems with audio quality.

Accordingly, there is a need for an improved assembly for a portable communication device having a user interface incorporating a keypad and a speaker.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in an improved assembly for a keypad and speaker, such as for a portable communication device. The assembly, formed in accordance with the various embodiments, merges and interlaces speaker porting and keypad assembly together in the same space providing increased room for accessing user interface elements of the portable communication device, such as a display and the keypad itself. The assembly provides good audio performance, protection from water intrusion along with improved usage of space. Accordingly, the components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1:
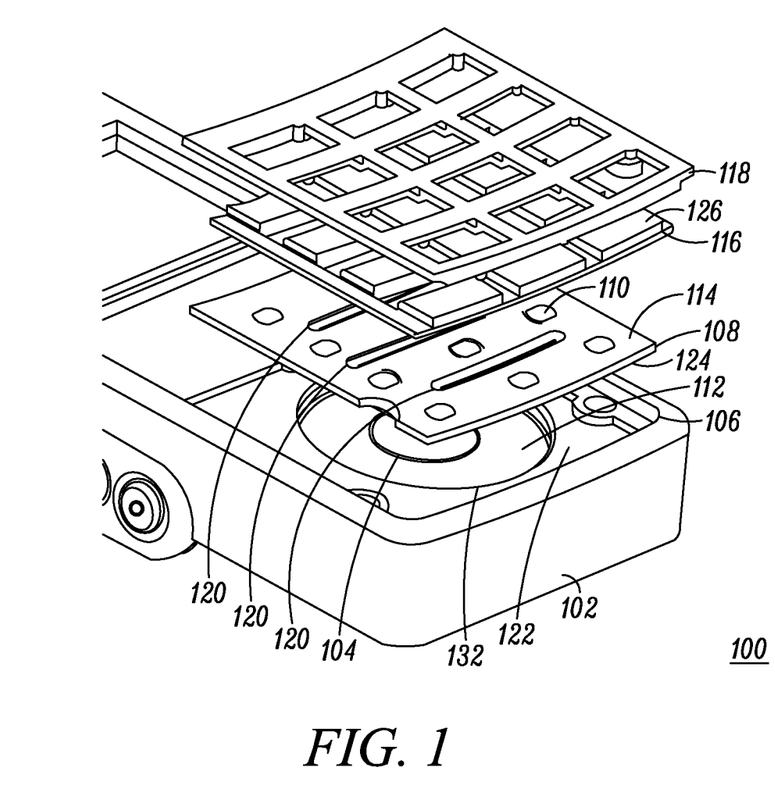
FIG. 1 shows an exploded view of a portable communication device having a keypad and speaker assembly formed in accordance with the various embodiments.

FIG. 1 shows an exploded view of a portable communication device having a keypad and speaker assembly 100 formed in accordance with the various embodiments. Assembly 100 comprises a housing 102, a speaker 104, a chassis 106 having a speaker aperture 112 recessed therein, a keyboard 108 having a top surface 114 and back surface 124, with slots 120 formed therethrough, a keypad 116 having a plurality of keys 126, a bezel 118 having openings for receiving the keys 126 of the keypad 116, the openings providing a plurality of tortuous porting 220 (the tortuous porting being shown in FIG. 2), and an impact absorber element 122 having an opening 132.

In accordance with the various embodiments, the speaker 104 is located behind the keyboard 108. The speaker 104 is mounted within the speaker aperture 112 of the chassis 106. The impact absorber element 122 is adhered to the chassis 106 such that opening 132 of the impact absorber element 122 aligns with speaker aperture 112 of the chassis 106. The impact absorber element 122 lies beneath the keyboard 108. Other embodiments will further show that a slotted metal plate can be added behind the keyboard 108 for additional support. The keyboard 108 is seated upon the impact absorber element 122 such that the audio slots 120 of the keyboard are located over the speaker aperture 112 and opening 132. The speaker aperture 112 and opening 132 provide sufficient air volume for speaker excursion. The impact absorber element 122 provides a cushion of protection between the speaker 104 and the keyboard 108.

Keyboard 108 comprises a printed circuit board having electrical and mechanical components disposed thereon. In accordance with the various embodiments, the audio slots 120 of keyboard 108 are formed of elongated, oval shaped openings which align, with a partial offset, beneath the keys of keypad 116. In accordance with the various embodiments, one audio slot 120 is used for each row of keys. The keyboard 108 having a single elongated oval shaped slot 120 per row allows for simplified row to row porting. The keyboard 108 further comprises surface mount components, such as LEDs (shown in FIG. 7) and domes 110. The keyboard 108, including the domes, is covered by a non-conductive material, such as Mylar, adhered to the front surface 114 of the keyboard 108. Felt may be adhered or placed against the back surface 124 of the keyboard 108. The bezel 118 may be assembled to the keypad 116 and the bezel/keypad maybe assembled to the front housing 102. Alternatively, the keyboard 108 maybe assembled into the front housing 102 and then the bezel 118 mounted thereto. The entire assembly is held in place by the bezel 118, for example with a plurality of screws or other attachment means.

Figure 2:
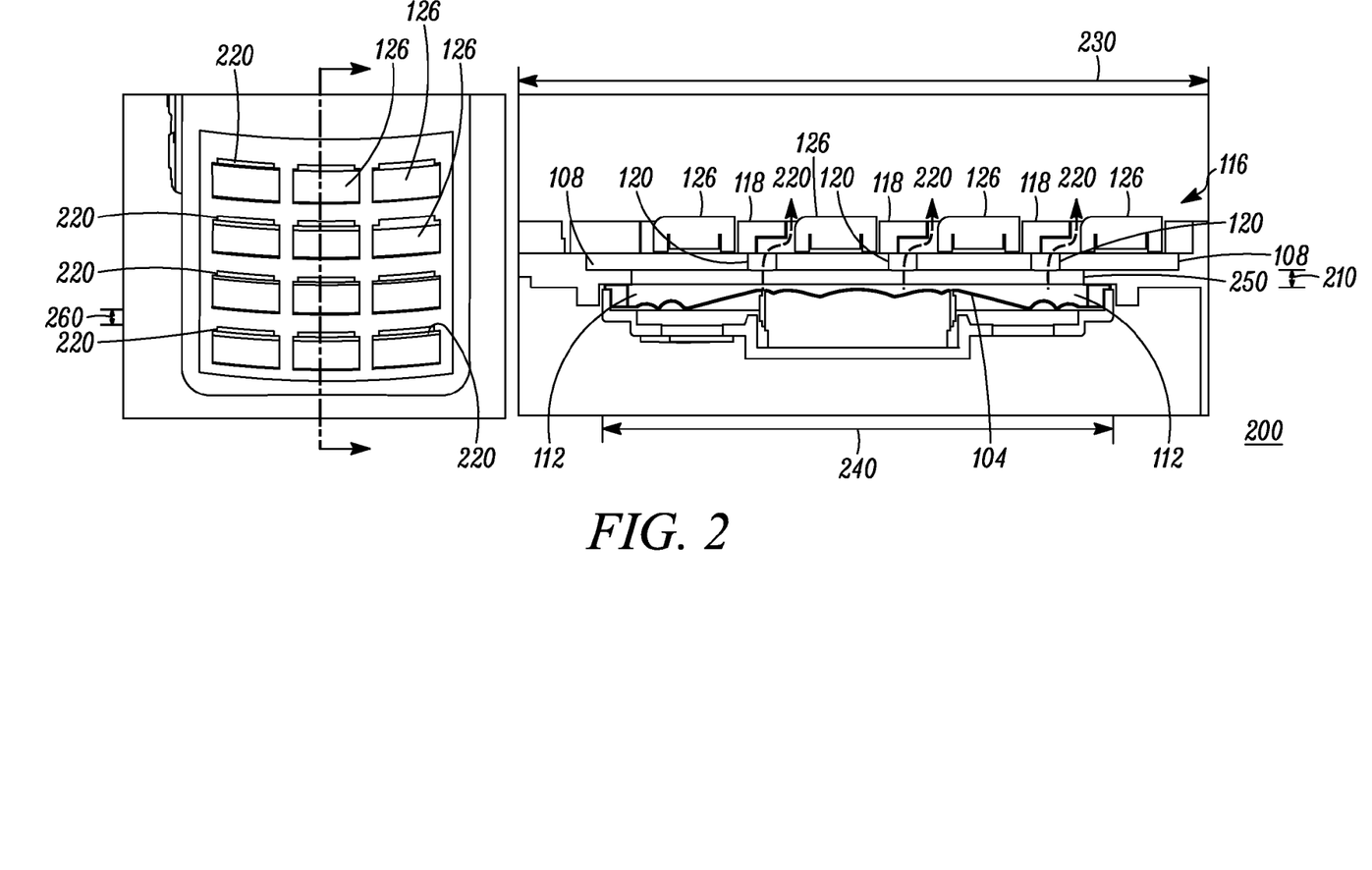
FIG. 2 shows a partial cross sectional view of the keypad and speaker assembly of FIG. 1 in accordance with various embodiments.

FIG. 2 shows a partial cross sectional view of the assembly of FIG. 1 formed in accordance with the various embodiments. In accordance with the various embodiments, the bezel 118 provides a speaker grille comprising tortuous porting 220. The tortuous porting 220 is formed of passageways of twists or turns within the bezel 118. In accordance with the various embodiments, the tortuous porting 220 provides a predetermined port length for minimum grille thickness while maximizing open area for audio. The tortuous porting 220 provides air passages which are offset from audio slots 120 of keyboard 108 but provide an unobstructed air path from the speaker 104 to the exterior of the bezel 118 (ambient environment).

Keypad 116, having keys 126, is mounted within bezel 118. The passageways of the tortuous porting 220 are located above the chassis speaker aperture 112 and impact absorber element opening 132. The impact absorber element 122 comprises a predetermined minimum thickness to allow for a maximum excursion 210 of the speaker 104 within speaker aperture 112, for example the predetermined minimum width may be 2.2 mm for a speaker being used for two-way handheld radio applications.

Past assemblies have tended to have obstructed air passages or air paths, typically caused by parts or materials associated with the keyboard blocking the air paths, forcing speaker audio to travel through the blocking materials. Audio passing through such blocking materials tends to excite the materials thereby causing vibration or rattling. The audio slots 120 and tortuous porting 220 formed in accordance with the various embodiments provide unobstructed air passages between the speaker 104 and ambient environment thereby negating problems with vibration and rattling.

The assembly 100 formed in accordance with the various embodiments advantageously accommodates keypad materials, keyboard, housing and speaker grille into a very compact stack up while maintaining an unobstructed and yet tortuous air path. Thus, the audio slots 120 and tortuous porting 220 providing unobstructed air passages between the speaker 104 and ambient environment allows for an improved stack up with minimal space and appropriate loudness. The keyboard 108 having a single elongated oval shaped porting 120 per row allows for simplified row to row porting.

In accordance with the various embodiments, the audio slots 120 and tortuous porting 220 provide a bypass path for water thereby minimizing water retention in the housing. Felt 250 may be attached to the back of the keyboard 108. The felt 250 can be used to minimize intrusion of dust and other foreign materials. Dimensions can be selected to accommodate the speaker 104. For example, a bezel length 230 providing speaker porting may be for example 43.7 mm, to accommodate a speaker having a speaker basket length 240 of 36 mm.

In accordance with the various embodiments, the audio slots 120 and tortuous porting 220 allows the keypad 116 to be compartmentalized outside the radio. Large row to row spacing 260 of keys 126 of keypad 116 can be accommodated. For example, 10 mm spacing between rows facilitates gloved usage of the device for an improved user interface. The use of a tortuous porting protects the felt 250 and speaker 104 and further minimizes water intrusion. The tortuous porting 220 provides a predetermined port length for minimum grille thickness in bezel 118 while maximizing open area for audio.

Figure 3:
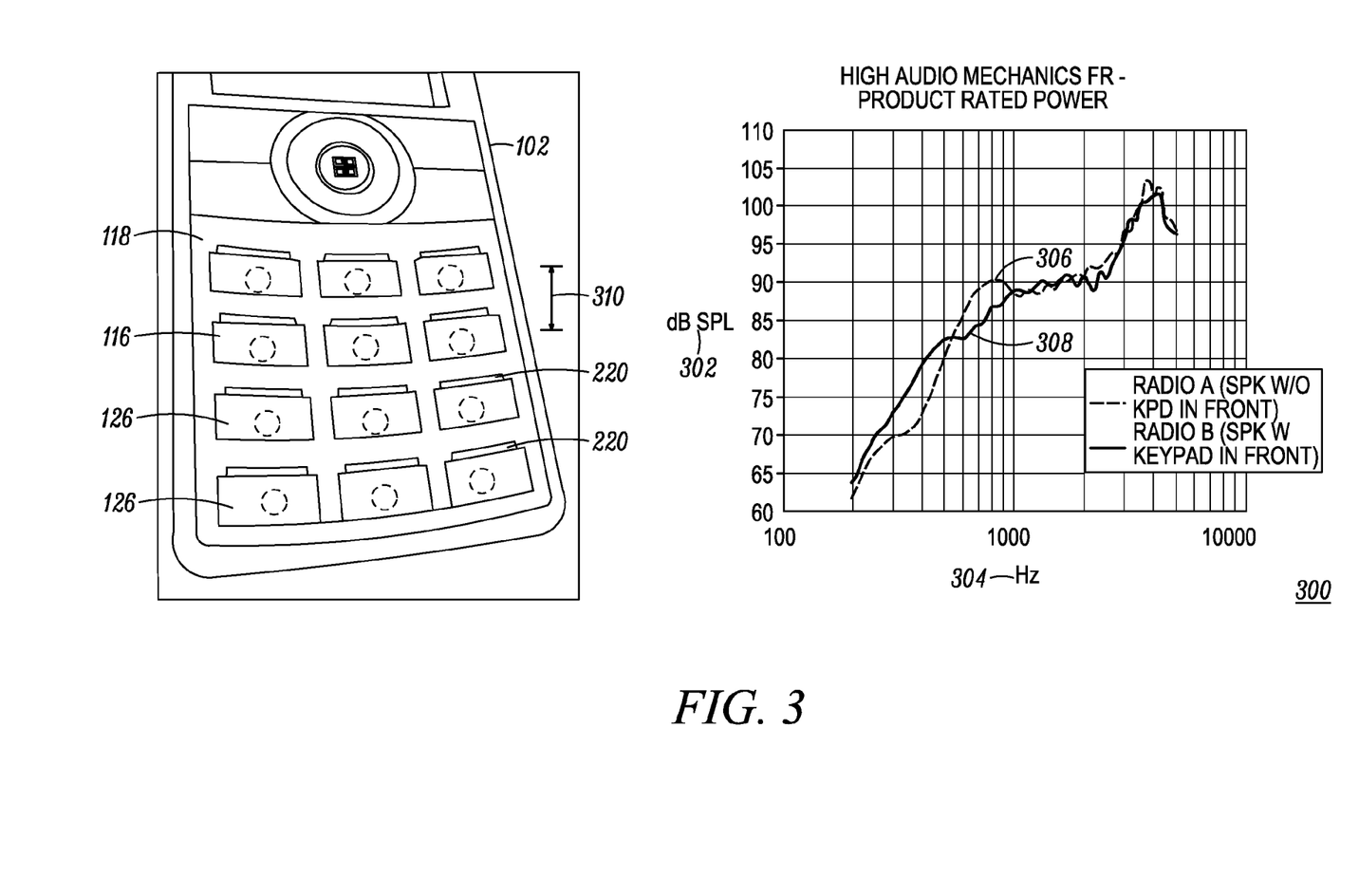
FIG. 3 shows a handheld communication device and example data in accordance with the various embodiments.

FIG. 3 shows an example of a handheld communication device and example data in accordance with the various embodiments. The communication device comprises housing 102 having keypad 116 and bezel 118 formed in accordance with the various embodiments. The keypad 116 and bezel 118 provide an improved user interface through the use of a larger pitch between rows of keys 126. In this example, a 10 mm pitch between the center 310 of the rows of keys 126 was used to generate the data shown in graph 300. Audio testing on a prototype provided measurement data shown in graph 303 indicating loudness (dB SPL) on the y-axis 302 versus frequency (Hz) on the x-axis 304. Two radios, radio A, 306 and radio B 308, were tested having similar mechanics except that radio B incorporated the keyboard and speaker assembly 100 formed in accordance with the various embodiments with the speaker 104 mounted behind the keyboard 108 and the keyboard 108 having the tortuous porting 220, while radio A had the speaker mounted directly on the front housing 102 without keypad assembly in front of it, but maintaining the tortuous porting 220. High audio performance from the front of the radio was measured and compared. Graph 300 shows that the loudness measurement showed similar performance between radio A and radio B. Thus, graph 300 supports that effective porting has been provided by the keypad and speaker assembly 100 formed in accordance with the various embodiments.

Figure 4:
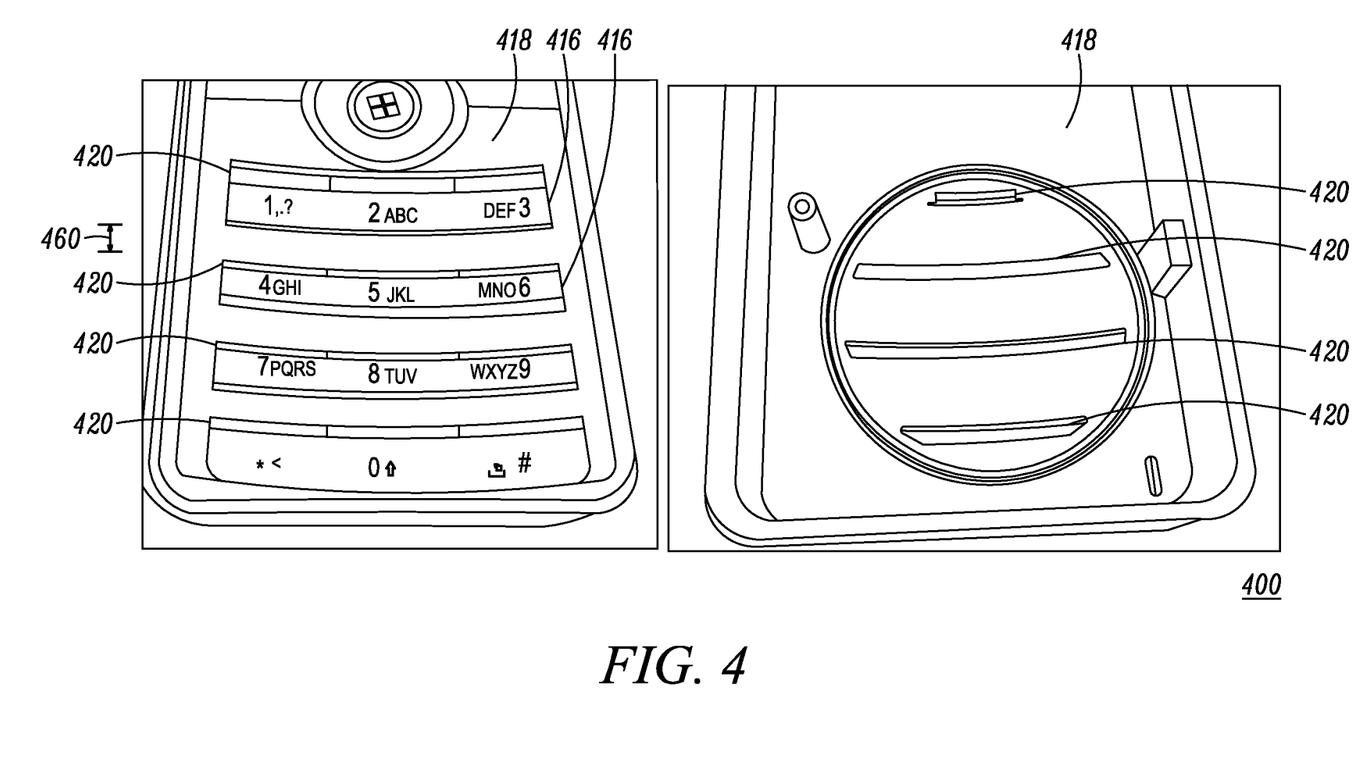
FIG. 4 shows another example of a keypad speaker assembly comprising tortuous porting formed in accordance with the various embodiments.

FIG. 4 shows another example of a keypad speaker assembly 400 comprising tortuous porting formed in accordance with the various embodiments. In this example, the keyboard would be formed similarly to FIG. 1-3, that is keyboard 108 with elongated audio slots 120. However, rather than a bezel over a keypad of individual keys as shown and described in FIGS. 1-3, example 400 illustrates how spacing 460 between numeric keypad rows can be maximized through the use of an overlay keypad 416. The bezel 418 has elongated porting 420 offset from overlay keypad 416, in the manner described in conjunction with FIGS. 1-2. The formation of the unobstructed air passages is the same as that shown in FIGS. 1-2.

The keyboard would be formed similarly to FIG. 1-2 with elongated audio slots 120. Accordingly, a bezel 118 can be formed with individual tortuous porting 220 per selected individual keys, or a bezel 418 with elongated tortuous porting 420 can be formed to accommodate a row or a plurality of keys. Thus, in accordance with the various embodiments, the bezel can be formed with tortuous porting to accommodate individual keys or an overlay keypad without departing from the scope of the invention.

Figure 5:
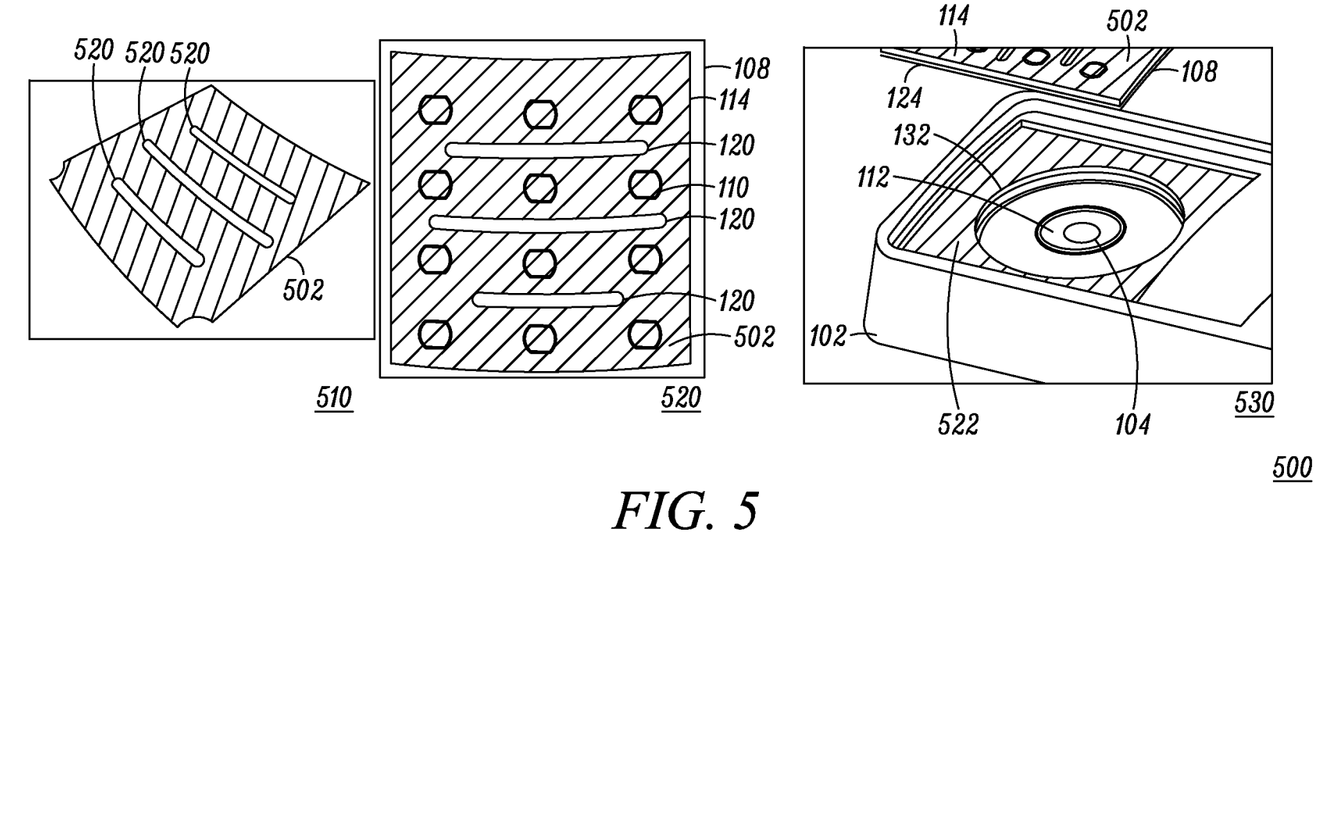
FIG. 5 shows the water sealing characteristics for the keyboard and speaker assembly formed in accordance with the various embodiments.

FIG. 5 shows the water sealing characteristics 500 for the keyboard and speaker assembly formed in accordance with the various embodiments. View 510 shows an adhesive layer 502, such as an adhesive Mylar layer, or similar plastic film material, comprising elongated cut-outs 520 to align with the audio slots 120 of keyboard 108. View 520 shows the adhesive layer 502 adhered to the top surface 114 of keyboard 108. The adhesive layer 502 seals the electrical and mechanical keyboard components, such as domes 110, LEDs and the like. View 530 shows housing 102 with the impact absorber element 122 inserted therein and covered with another adhesive layer 522 about the opening 132. View 530 shows keyboard 108 with adhesive layer 502 adhered thereto being inserted into housing 102 towards impact absorber element 122 having adhesive layer 522 disposed thereon. Thus, when inserted, the keyboard audio slots 120 of keyboard 108 are surrounded by adhesive on both the top surface 114 and the back surface 124 while being aligned over the chassis recessed aperture 112 and opening 132 of impact absorber element 122. The combination of volumetric air space and sealing provides for optimal audio performance of the speaker 104 and sealing of the keyboard 108.

Figure 6:
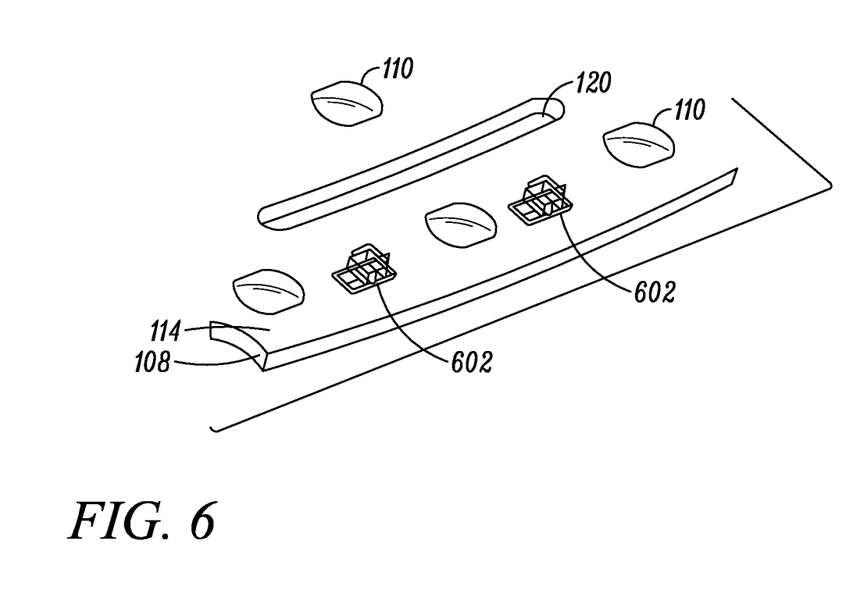
FIG. 6 shows an example of components located on the keyboard in accordance with the various embodiments.

FIG. 6 shows an example of components located on the keyboard 108 in accordance with the various embodiments. Domes 110 and LEDs 602, such as reverse mounted LEDs, are coupled to top surface 114 of the keyboard 108, the keyboard being covered by the adhesive layer 502 previously described in FIG. 5. The domes 110 and LEDs 602 may further be individually covered with a thermofed sheet for water sealing. FIG. 6 thus illustrates how components can now be brought outside of the speaker's audio path by being disposed on the top surface 114 of keyboard 108, beneath the bezel 118, thereby minimizing audio obstructions.

Figure 7:
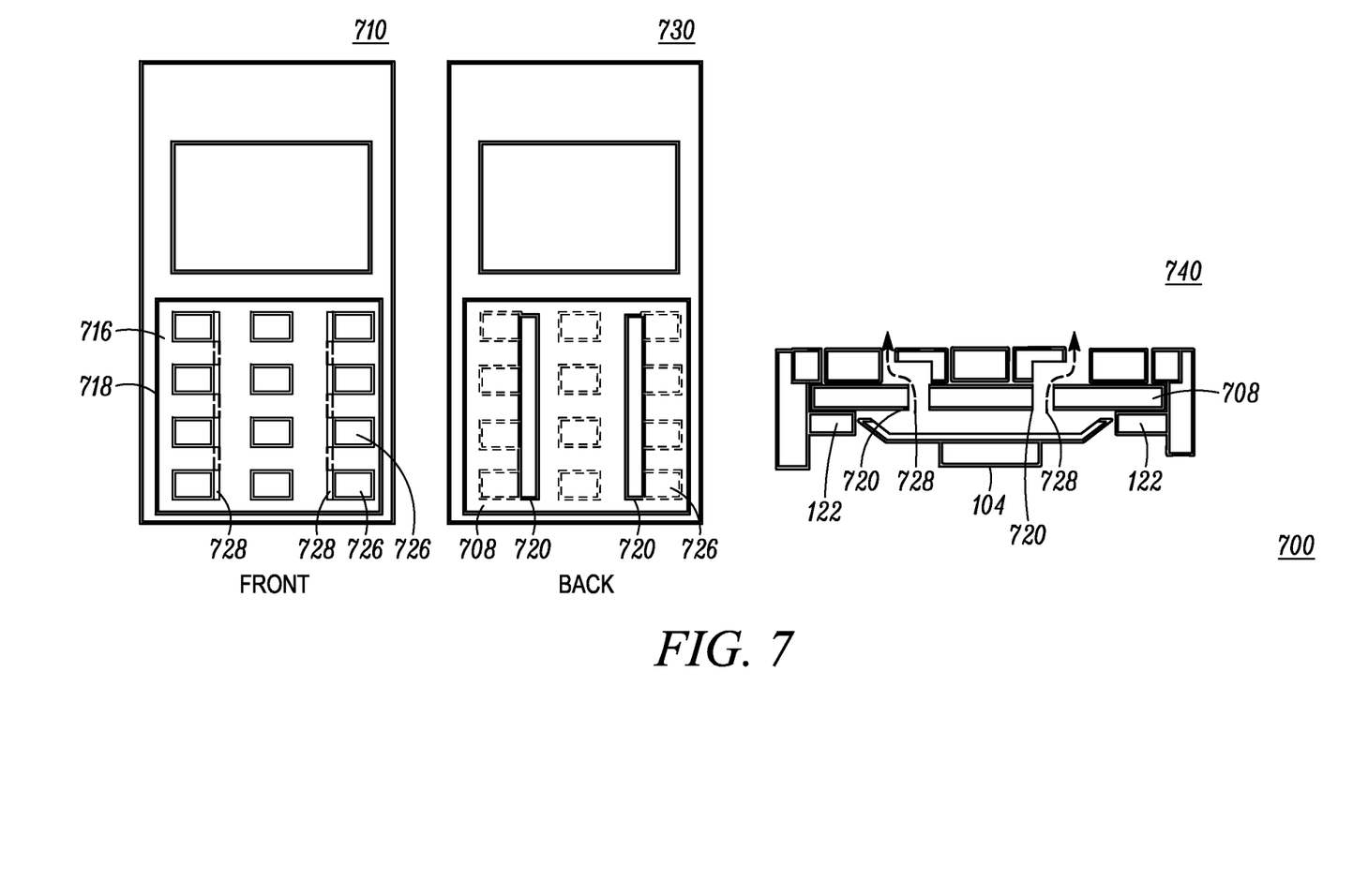
FIG. 7 shows an example of another keyboard and speaker assembly formed in accordance with the various embodiments.

FIG. 7 shows an example of another keyboard and speaker assembly formed in accordance with the various embodiments. Example 700 shows a vertical slot arrangement comprising air passages formed of vertical audio slots 720 within a keyboard 708. The bezel 818 comprises tortuous porting passageways 728 along a vertical side of each key 726 of the outer two columns of keys of keypad 716. View 710 shows the bezel 718 having the tortuous porting passageways 728 vertically situated along each key 726 of the outer two rows of keys. View 730 shows the opposing side to illustrate the vertical audio slots 720 of the keyboard 708 being offset from the location of the keys 726. Similar water sealing approaches as described previously are utilized. In view 740, keyboard 708 is mounted upon impact absorber element 722. The audio generated from a speaker 104 passes through the tortuous porting passageways 728 in the manner previously described. The use of space has been minimized. The vertical approach provides an advantageous arrangement for radios of shorter length. Thus, view 740 provides for a plurality of vertical audio slots 720 formed within the keyboard 708 opening into individual tortuous passageways of bezel 718, each tortuous passageway 728 associated with predetermined keys of a column of vertical keys.

Figure 8:
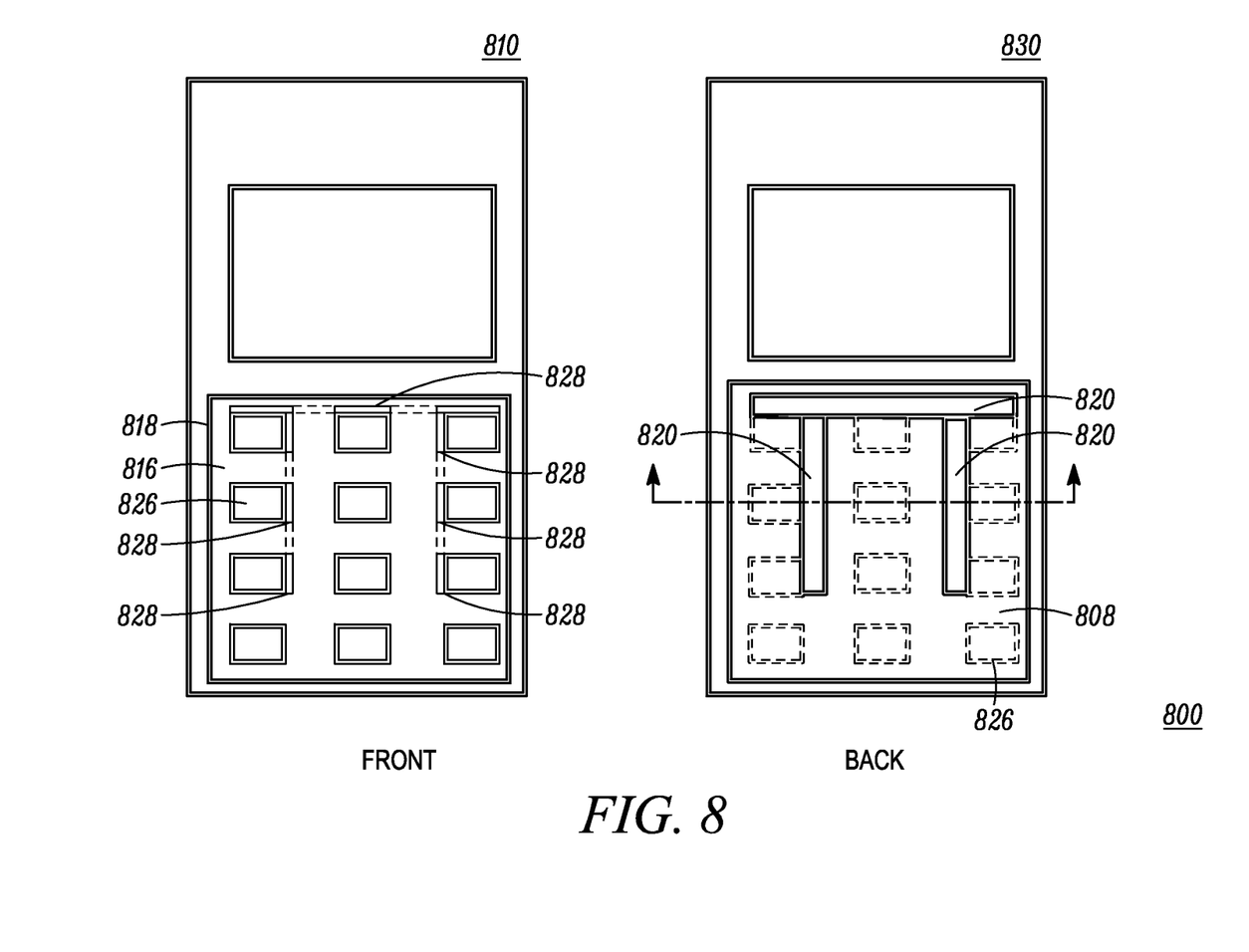
FIG. 8 shows yet another example of a keyboard and speaker assembly formed in accordance with the various embodiments.

FIG. 8 shows yet another example of a keyboard and speaker assembly 800 formed in accordance with the various embodiments. This embodiment shows how audio slots 820 of a keyboard 808 can be arranged both horizontally and vertically for a more customized approach. View 810 shows tortuous porting 828 is formed in bezel 818 as previously described to provide for the maximum loudness output possible. Adjustments can be made for spacing in between certain keys 826 which allows for the keypad 816 to accommodate different side keys and key spacing. The water sealing approach can be accomplished as previously described by providing sufficient landing areas for the adhesive to stick on. This approach provides versatility in the resultant size and gap between key to key. Thus, as seen in view 830 a plurality of vertical and horizontal audio slots 820 can be formed within the keyboard 808 opening into individual tortuous passageways 828 of bezel 818 for customized configurations.

The embodiments of FIGS. 7 and 8 show how the tortuous porting 220 of FIG. 2 (shown and described as tortuous porting 728 and 728 in FIGS. 7 and 8) can be formed in the bezel (118, 718, 818) along a vertical edge or horizontal edge of each key or some keys (126, 726, 826) of the keypad (116, 716, 816). The audio slots (120) can be horizontal audio slots formed in the keyboard (108, 708, 808) and aligned to run between rows of keys beneath the keypad. The audio slots (120) can be vertical audio slots formed in the keyboard (108, 708, 808) and aligned to run between columns of keys beneath the keypad. The tortuous porting (220) can be formed in the bezel (118) along a vertical edge and/or a horizontal edge of predetermined keys of the keypad (116). The tortuous porting along the vertical and/or horizontal edges of the predetermined keys are correspondingly offset from vertical and horizontal audio slots formed in the keyboard (108).

Subsequent figures, FIGS. 9-12, are provided to show another example of the keypad speaker assembly formed as part of a portable communication device in accordance with some embodiments. Rather than using a bezel and keypad, the embodiment of FIGS. 9-12 utilizes a keypad overlay 916. While previous embodiments have shown the keyboard 108 having a single elongated oval shaped porting 120 per row to allow for simplified row to row porting, the embodiment of FIGS. 9-12 utilizes audio slots 120 split into two smaller elongated oval shaped slots. This embodiment can be used to further increase the strength of the keyboard 108 and provide additional protection to the speaker 104, if desired.

The embodiment of FIGS. 9-12 still comprises structures for ruggedness (protection against drop), volume spacing for speaker excursion, and air passages for porting and water dispersion. In accordance this embodiment, the keypad overlay 916 provides a speaker grille comprising tortuous porting 920. The tortuous porting 920 is formed of passageways of twists or turns within the keypad overlay 916. The tortuous porting 920 is located between at least some predetermined keys. The keypad overlay 916 may be formed, for example, of a silicon/sheet-metal insert molded keypad.

Figure 9:
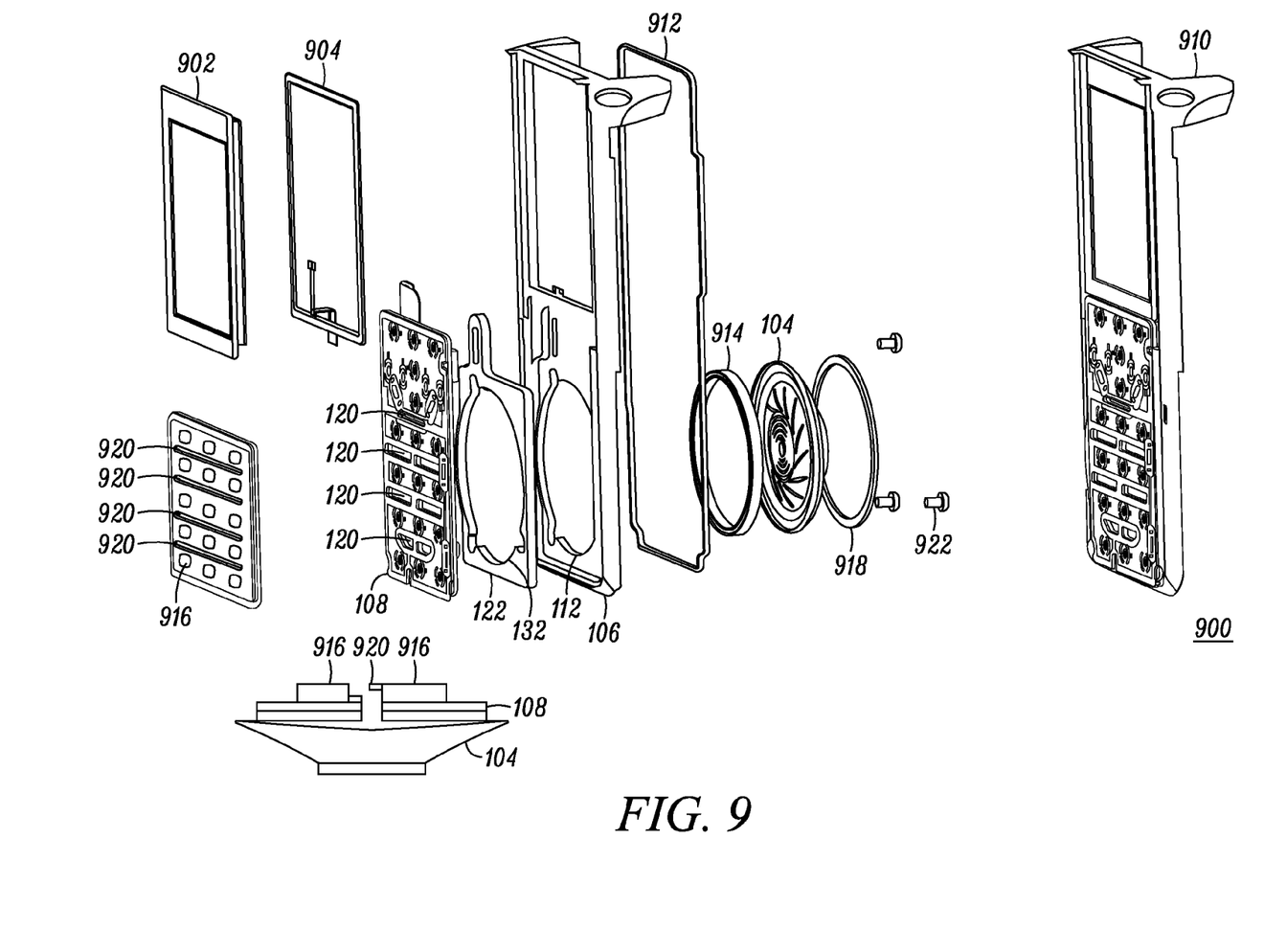
FIG. 9 is a front chassis sub-assembly in accordance with the various embodiments.

FIG. 9 is a front chassis sub-assembly 900 in accordance with the various embodiments. The assembly comprises display lens 902, a seal 904 for the lens, a keypad overlay 916 having tortuous porting formed therein 920, a keyboard 108 having audio slots 120, impact absorber element 122 having opening 132, chassis 106 having speaker aperture 112, a main seal 912, a speaker gasket 914, speaker 104, speaker retention bracket 918, and screws 922. The keyboard 108 may accommodate electrical and mechanical components as a keypad flex, light guide, tactile domes, LEDs and sealing. The impact absorber element 122, such as a silicon cushion or pad, can be used to provide additional support and maintains air space within its opening 132. The assembled view (without the keypad overlay 916) is shown as front assembled view 910.

In accordance with this embodiment, when keyboard 108 is coupled to the impact absorber element 122, the audio slots 120 and tortuous porting 920 are located over the recessed opening 132 of the impact absorber element 122. The tortuous porting 920 of keypad overlay 916 provides air passages which are offset from audio slots 120 of keyboard 108 but provide an unobstructed air path from the speaker 104 to the exterior of the bezel 118 (ambient environment).

Figure 10:
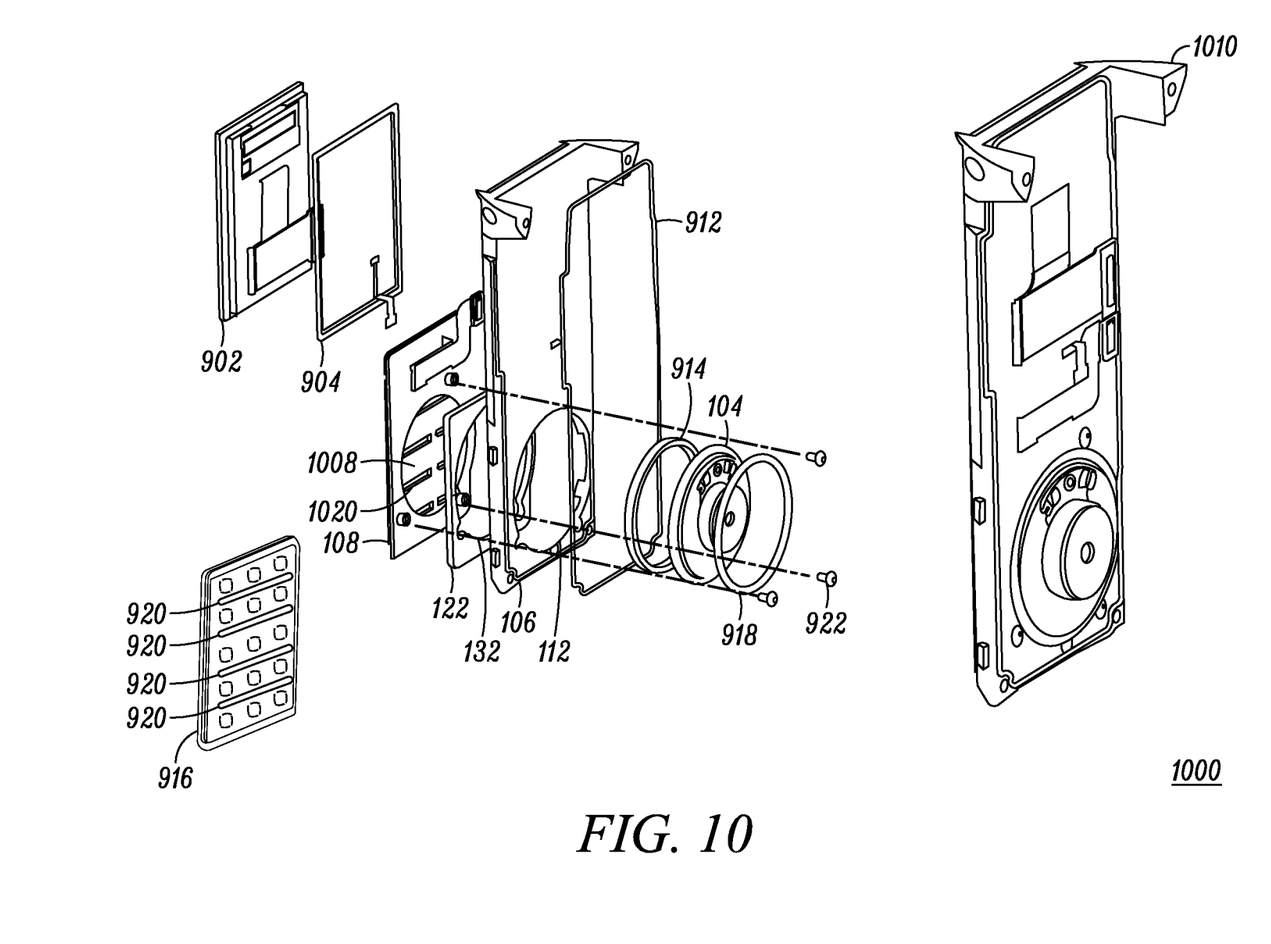
FIG. 10 is a rear view of the front chassis sub-assembly of FIG. 9 in accordance with the various embodiments.

FIG. 10 shows a rear view 1000 of the sub-assembly of FIG. 10 in accordance with the various embodiments. Again, the assembly comprises display lens 902, seal 904 for the lens, keypad overlay 916 having tortuous porting 920, and keyboard 108 which in this embodiment is backed by a support plate 1008. The assembly further comprises impact absorber element 122 having opening 132, front chassis 106 having speaker aperture 112, main seal 912, speaker 104 with front gasket 914, speaker retention bracket 918, and screws 922. The support plate 1008 comprises audio slots 1020 to align with the audio slots 120 of the keyboard 108. The support plate 1008 may be formed of metal or some other rigid support material. The keyboard's audio slots 120 in combination with the tortuous porting 920 of the keypad overlay 916 provide a bypass path for water thereby minimizing water retention in the housing. The assembled view is shown as assembled rear view 1010.

Figure 11:
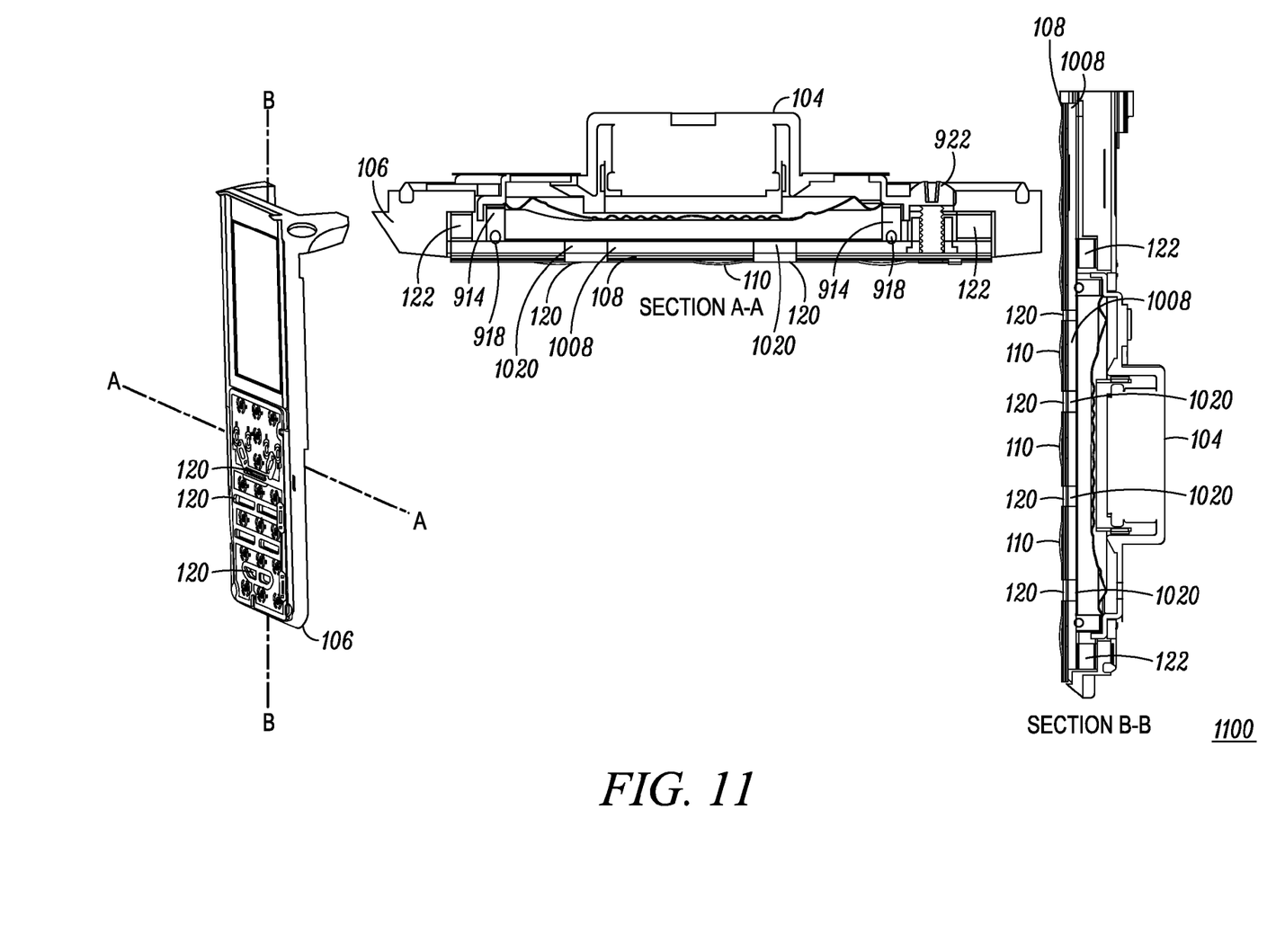
FIG. 11 shows the loudspeaker retention for the speaker keypad assembly in accordance with various embodiments.

FIG. 11 shows speaker retention 1100 for the speaker keypad assembly in accordance with various embodiments. Cross section A-A shows a horizontal cut across the keyboard 108 mounted within chassis 106. The impact absorber element 122 is mounted between the chassis 106 and the keyboard 108, such that the impact absorber element opening 132 surrounds the outer perimeter of the speaker gasket 914 and speaker retention bracket 918. Keyboard 108 is shown with domes 110 on its top surface and audio slots 120 formed therethrough and behind which is mounted metal plate 1008 having metal plate audio slots 1020 aligning with the keyboard's audio slots 120 for air access. The metal plate 1008 provides additional support for ruggedness, for example if the radio is dropped. The impact absorber element 122 provides additional support protection which further maintains air space for speaker excursion of speaker 104. The assembly 1100 is further coupled by the use of screws 922.

Cross section B-B shows a vertical cut across the keyboard 108. This view shows the keyboard 108 with domes 110 mounted upon metal plate 1008. The audio slots 120 of the keyboard 108 align with the metal plate slots 1020. The metal plate 1008 provides additional support for ruggedness, for example when the radio is dropped. The keyboard 108 is covered in a non-conductive adhesive material, such as Mylar, as previously described. Water diversion and drainage is provided by audio slots 120 as water entering one port can exit through another without damaging the keyboard 108.

Figure 12:
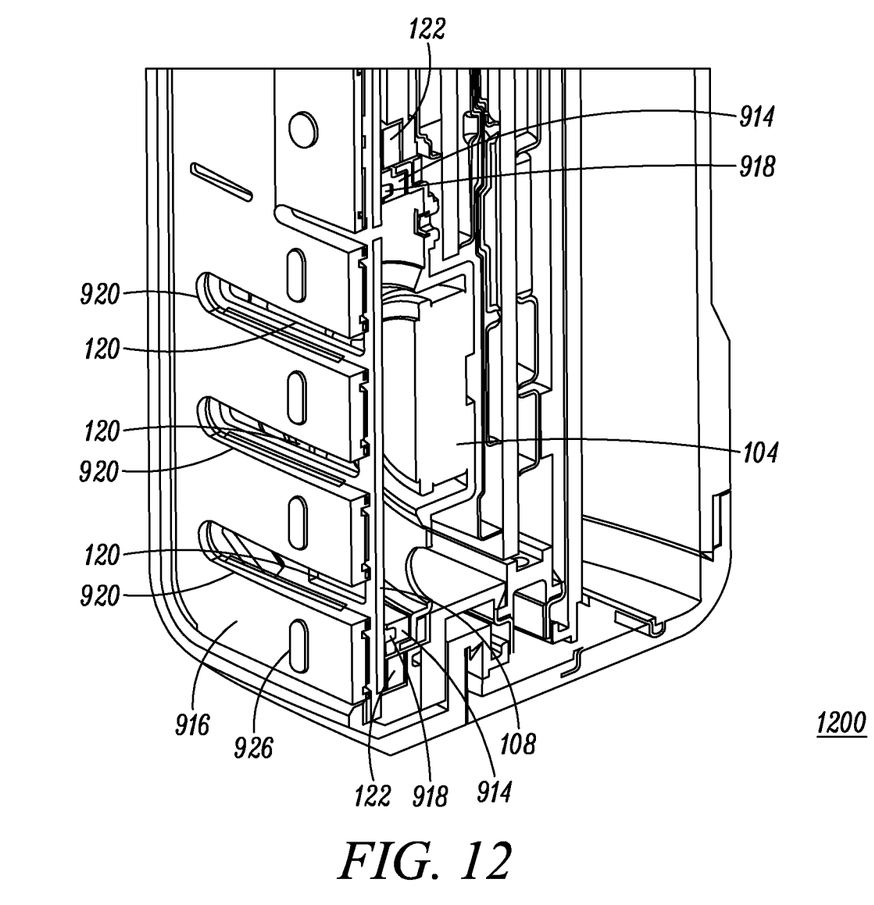
FIG. 12 shows a cut-away view stack-up view of an assembly formed in accordance with the various embodiments.

FIG. 12 shows a cut-away view for a stack-up an assembly 1200 formed in accordance with the various embodiments. Stack-up assembly 1200 comprises keypad overlay 916 and keyboard 108 coupled beneath the keypad overlay. The assembly 1200 further shows the impact absorber element 122 located beneath the keyboard 108. The impact absorber element 122 surrounds the speaker 104, the speaker being retained within speaker gasket 914 and speaker retention bracket 918. The speaker 104, in accordance with the various embodiments is located beneath the keyboard 108. The impact absorber element 122 provides protection from drop to both the keyboard 116 and the speaker 104. The keypad overlay 916 provides the tortuous porting 920 which is offset from the audio slots 120.

This view gives another illustration of how the speaker 104 is located behind the keyboard 108 and does not rest on the keyboard or take up keyboard space. In accordance with the various embodiments, the tortuous porting 920 is offset from the keys 926 of keypad overlay 916.

Accordingly, there has been provided a keypad and speaker assembly provided by the various embodiments minimize front volume, while maximizing open areas between keys and minimizing port length (through the chassis and keypad). The front volumes can be held small but still allow for speaker excursion. A portable radio communication device incorporating the speaker and keypad assembly is provided with ruggedness against drop and water intrusion while maintaining sufficient loudness and an improved user interface with more room between the keys.

Unlike some prior art assemblies in which the speaker rests on a printed circuit board or requires a large speaker opening in the printed circuit board whereby the speaker is sandwiched between the keypad and a pcb, the assembly provided by the various embodiments allow the speaker 104 to be coupled behind the keyboard 108, while maintaining audio loudness performance through the use of tortuous and dedicated porting, between rows of keys while taking up minimum space. Using audio slots 120 within the keyboard 108 partially offset from the tortuous porting 220 of the speaker grill, and the tortuous porting of the speaker grille being offset from the keys 126 of the keypad 116 provides unobstructed audio paths for loudness along with water bypass capability. Keypads can now be suitably pitched for ample spacing between keys for ease of use. Larger keys and larger speakers can now be used in smaller housings as the embodiments described by the assembly make optimum use of space. Circuitry can now be brought to the outside surface of the keyboard at the location of speaker grilles without interfering with audio.

The use of the keyboard and speaker assembly in the housing of a communication device maintains a logistical user interface while providing structural robustness. Portable handheld radio products, particularly those utilized in the public safety communications environment where a plurality of user interface features are incorporated within tight space constraints will benefit greatly from the assembly provided by the various embodiments. For example, the increased spacing between keys of the user interface facilitates gloved usage.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:
1. A communication device, comprising:
 a housing having a speaker and keypad assembly comprising;

a bezel coupled to the housing, the bezel providing a speaker grille comprising tortuous porting formed of passageways of twists or turns;

a keypad coupled to the bezel;

a keyboard having audio slots formed there through, the audio slots being partially offset from the tortuous porting of the speaker grill; and a speaker mounted behind the audio slots of the keyboard, the audio slots-and tortuous porting providing unobstructed air passages between the speaker and ambient environment.

2. The communication device of claim 1, wherein the audio slots and tortuous porting provide a bypass path for water thereby minimizing water retention in the housing.

3. The communication device of claim 1, further comprising:

a chassis formed within the housing, the chassis having a speaker aperture for retaining the speaker;

an impact absorber element coupled between the chassis and the keyboard, the impact absorber element having an opening within which the speaker is recessed.

4. The communication device of claim 1, wherein the keyboard is adhesively adhered to the impact absorber element, the speaker being recessed for predetermined speaker excursion within the opening of the impact absorber element and the aperture of the chassis.

5. The communication device of claim 1, wherein the impact absorber element comprises a silicon pad adhesively coupled between the chassis and the keyboard.

6. The communication device of claim 1, further comprising:

a support impact plate coupled between a back surface of the keyboard and the impact absorber element.

7. The communication device of claim 6, wherein the support impact plate comprises corresponding slots for aligning with the audio slots of the keyboard.

8. The communication device of claim 1, wherein the tortuous porting provides a predetermined port length for minimum grille thickness while maximizing open area for audio.

9. The portable communication device of claim 1, wherein the portable communication device comprises a public safety radio.

10. The portable communication device of claim 1, wherein the tortuous porting of the bezel is offset from keys of the keypad, and the audio slots of the keyboard are partially offset from the tortuous porting.

11. The portable communication device of claim 1, wherein the tortuous porting provides air passages which are offset from the audio slots of the keyboard but provide an unobstructed air path from the speaker to the exterior of the bezel.

12. A keypad and speaker assembly, comprising:

a keypad having a plurality of keys;

a keyboard comprising a plurality of audio slots formed therein;

a bezel having openings for receiving the keys;

the keypad coupled within the openings of the bezel, the bezel providing a predetermined offset from predetermined keys of the keypad to form tortuous porting of twists or turns that provide passageways at individual keys of the keypad;

the keyboard having a top surface coupled to the bezel such that the audio slots in the keyboard are offset from the individual predetermined keys;

an impact absorber element having an opening within which a speaker is recessed; and the keyboard having a back surface coupled to the impact absorber element such that the audio slots and tortuous porting are located over the recessed opening of the impact absorber element thereby providing an unobstructed air path between the speaker and ambient.

13. The keypad and speaker assembly of claim 12, wherein the tortuous porting is formed by the bezel along a vertical edge of each key of the keypad.

14. The keypad and speaker assembly of claim 12, wherein the tortuous porting is formed by the bezel along a horizontal edge of each key of the keypad.

15. The keypad and speaker assembly of claim 12, wherein the audio slots are horizontal audio slots formed in the keyboard and aligned to run between rows of keys beneath the keypad.

16. The keypad and speaker assembly of claim 12, wherein the audio slots are vertical audio slots formed in the keyboard and aligned to run between columns of keys beneath the keypad.

17. The keypad and speaker assembly of claim 12, wherein the tortuous porting is formed by the bezel along a horizontal edge of a key of the keypad and associated with a horizontal audio slot of the keyboard.

18. The keypad and speaker assembly of claim 12, wherein the tortuous porting is formed by the bezel along a vertical edge of a key of the keypad and associated with a vertical audio slot of the keyboard.

19. The keypad and speaker assembly of claim 12, wherein the tortuous porting is formed by the bezel along a vertical edge and horizontal edge of predetermined keys of the keypad.

20. The keypad and speaker assembly of claim 19, wherein the tortuous porting along the vertical and horizontal edges of the predetermined keys are offset from vertical and horizontal audio slots formed in the keyboard.

21. The keypad and speaker assembly of claim 12, wherein the tortuous porting provides air passages which are offset from the audio slots of the keyboard but provide an unobstructed air path from the speaker to the exterior of the bezel.

22. A keypad and speaker assembly, comprising:

a speaker grille comprising tortuous porting formed of passageways of twists or turns;

a keyboard, coupled beneath the speaker grille, the keyboard comprising audio slots, the audio slots being offset from the tortuous porting by a predetermined offset; and a speaker aligned beneath the keyboard, wherein the tortuous porting of the speaker grille and the audio slots of the keyboard offset from the tortuous porting provide air passages between the speaker and ambient.

23. The keypad and speaker assembly of claim 22, wherein the speaker grille formed of tortuous porting is formed as part of a bezel.

24. The keypad and speaker assembly of claim 22, wherein the speaker grille formed of tortuous porting is formed as part of a keypad overlay.

25. The keypad and speaker assembly of claim 22, wherein the tortuous porting provides air passages which are offset from the audio slots of the keyboard but provide an unobstructed air path from the speaker to the exterior ambient environment.

* * * * *